(12) United States Patent
Green et al.

(10) Patent No.: US 12,194,441 B2
(45) Date of Patent: Jan. 14, 2025

(54) ZONED AMMONIA SLIP CATALYST FOR IMPROVED SELECTIVITY, ACTIVITY AND POISON TOLERANCE

(71) Applicant: Johnson Matthey Public Limited Company, London (GB)

(72) Inventors: Alexander Nicholas Green, Royston (GB); Neil Greenham, Royston (GB); Matthew Eben Harris, Royston (GB)

(73) Assignee: Johnson Matthey Public Limited Company, London (GB)

( * ) Notice: Subject to any disclaimer, the term of this patent is extended or adjusted under 35 U.S.C. 154(b) by 370 days.

(21) Appl. No.: 17/757,052

(22) PCT Filed: Dec. 10, 2020

(86) PCT No.: PCT/GB2020/053160
§ 371 (c)(1),
(2) Date: Jun. 8, 2022

(87) PCT Pub. No.: WO2021/116683
PCT Pub. Date: Jun. 17, 2021

(65) Prior Publication Data
US 2023/0035318 A1    Feb. 2, 2023

Related U.S. Application Data

(60) Provisional application No. 62/946,070, filed on Dec. 10, 2019.

(51) Int. Cl.
*B01J 23/42* (2006.01)
*B01D 53/94* (2006.01)
(Continued)

(52) U.S. Cl.
CPC .......... *B01J 23/42* (2013.01); *B01D 53/9436* (2013.01); *B01J 29/7615* (2013.01); *B01J 37/0246* (2013.01)

(58) Field of Classification Search
CPC ........ B01J 23/42; B01J 29/7615; B01J 29/46; B01J 29/76; B01J 37/0246; B01J 37/0244;
(Continued)

(56) References Cited

U.S. PATENT DOCUMENTS 10,500,571 B2 * 12/2019 Greenham ............... B01J 35/19
10,926,221 B2 *  2/2021 Chen ..................... F01N 3/2828
(Continued)

FOREIGN PATENT DOCUMENTS

CN         107847863 A      3/2018
DE   10 2016 111 150 A1   12/2016
(Continued)

*Primary Examiner* — Dapinder Singh
(74) *Attorney, Agent, or Firm* — BakerHostetler

(57) ABSTRACT

A catalytic article for treating exhaust gas comprising: a substrate comprising an inlet end and an outlet end with an axial length L; a first catalytic region comprising a first platinum group metal (PGM) component and a support; a second catalytic region comprising a second PGM component on a support with low ammonia storage and a first SCR catalyst; and wherein the first catalytic region is covered by at least another catalytic region.

21 Claims, 11 Drawing Sheets

(51) Int. Cl.
*B01J 29/76* (2006.01)
*B01J 37/02* (2006.01)

(58) Field of Classification Search
CPC ... B01J 37/0248; B01J 35/19; B01D 53/9436; B01D 53/9477; B01D 2255/1021; B01D 2255/20761; B01D 2255/50; B01D 2255/902; B01D 2255/903; B01D 2255/504; B01D 2258/012; F01N 3/103; F01N 3/0828; F01N 3/2803; F01N 3/106; F01N 3/2066; F01N 3/021; F01N 13/009; F01N 13/0093; F01N 2370/02; F01N 2370/04; F01N 2510/0682; Y02T 10/12
See application file for complete search history.

(56) References Cited

U.S. PATENT DOCUMENTS

| | | | |
|---|---|---|---|
| 11,130,096 | B2* | 9/2021 | Shacklady-McAtee ................. B01J 37/0009 |
| 2015/0037233 | A1 | 2/2015 | Fedeyko |
| 2016/0367941 | A1* | 12/2016 | Gilbert ............... B01D 53/9436 |
| 2016/0367975 | A1 | 12/2016 | Lu et al. |
| 2018/0264446 | A1 | 9/2018 | Burgess |
| 2018/0280876 | A1 | 10/2018 | Chen et al. |

FOREIGN PATENT DOCUMENTS

| | | |
|---|---|---|
| DE | 102016110999 A1 | 12/2016 |
| EP | 3 310 458 A1 | 4/2018 |
| EP | 3310462 B1 | 7/2019 |
| RU | 2011115055 C2 | 11/2012 |
| WO | 2016/203249 A1 | 12/2016 |

* cited by examiner

ZONED AMMONIA SLIP CATALYST FOR IMPROVED SELECTIVITY, ACTIVITY AND POISON TOLERANCE

FIELD OF THE INVENTION

The invention relates to ammonia slip catalysts (ASC), articles containing ammonia slip catalysts and methods of manufacturing and using such articles to reduce ammonia slip.

BACKGROUND OF THE INVENTION

Hydrocarbon combustion in diesel engines, stationary gas turbines, and other systems generates exhaust gas that must be treated to remove nitrogen oxides ($NO_x$), which comprises NO (nitric oxide) and $NO_2$ (nitrogen dioxide), with NO being the majority of the $NO_x$ formed. $NO_x$ is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. $NO_x$ needs to be reduced selectively with a catalyst and a reductant in a process known as selective catalytic reduction (SCR) that converts $NO_x$ into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of $NO_x$, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

Despite various efforts in the field, there is still a need for better ASC catalyst with improved technical benefits.

SUMMARY OF THE INVENTION

In first aspect, the invention relates to a catalytic article for treating exhaust gas comprising: a substrate comprising an inlet end and an outlet end with an axial length L; a first catalytic region comprising a first platinum group metal (PGM) component and a support; a second catalytic region comprising a second PGM component on a support with low ammonia storage and a first SCR catalyst; and wherein the first catalytic region is covered by at least another catalytic region.

In another aspect, the invention relates to exhaust systems comprising the catalytic articles as described in the first aspect.

In yet another aspect, the invention relates to methods of treating exhaust gas from an internal combustion engine by contacting the exhaust gas with the catalytic articles as described in the first aspect.

In still another aspect, the invention relates to methods of reducing $N_2O$ formation from $NH_3$ in an exhaust gas, the method comprising contacting an exhaust gas comprising ammonia with the catalytic articles as described in the first aspect.

DETAILED DESCRIPTION OF THE INVENTION

Figure 1:
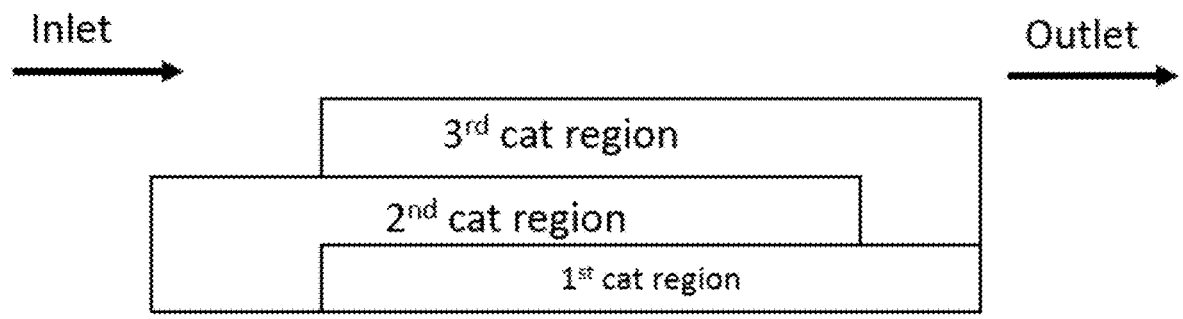
FIG. 1 depicts a configuration in which first catalytic region extends from the outlet end, second catalytic region extends from the inlet end and partially covers the first catalytic region, and third catalytic region extends from the outlet end and partially covers the second catalytic region.

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "ammonia slip", means the amount of unreacted ammonia that passes through the SCR catalyst.

The term "support" means the material to which a catalyst is fixed.

The term "a support with low ammonia storage" means a support that stores less than 0.001 mmol $NH_3$ per $m^3$ of support. The support with low ammonia storage is preferably a molecular sieve or zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the support with low ammonia storage is a molecular sieve or zeolite having a framework type selected from the group consisting of BEA, CDO, CON, FAU, MEL, MFI and MWW, even more preferably the framework type is selected from the group consisting of BEA and MFI.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "$N_2$ selectivity" means the percent conversion of ammonia into nitrogen.

The term "platinum group metal" or "PGM" refers to platinum, palladium, ruthenium, rhodium, osmium and iridium. The platinum group metals are preferably platinum, palladium, ruthenium or rhodium.

In the first aspect of the invention, a catalytic article for treating exhaust gas comprising: a substrate comprising an inlet end and an outlet end with an axial length L; a first catalytic region comprising a first platinum group metal (PGM) component and a support; a second catalytic region comprising a second PGM component on a support with low ammonia storage and a first SCR catalyst; and wherein the first catalytic region is covered by at least another catalytic region.

First Catalytic Region

The first catalytic region can fully oxidize $NH_3$ into $NO_x$ and $H_2O$, including at low temperatures such as below about 250° C., below about 200° C., or below about 150° C. The first PGM can be Pt or combinations of Pt and Pd. Preferably, the first PGM is Pt. In certain embodiments, the first catalytic region can contain at least about 30 weigh percent, at least about 50 weight percent, at least about 60 weight percent, at least about 75 weight percent, or at least about 90 weight percent Pt, based on the total weight of the noble metal present in the first catalytic region.

The support is preferably a high surface area support. The type of support is not particularly limited provided that it is a particle having a large surface area, is inert, and is suitable for use in an after-treatment system. Examples of support materials include refractory metal oxides such as alumina, silica, zirconia, titania, ceria, and physical mixtures or composites thereof, with alumina being particularly preferred. In certain embodiments, the supports have wide pores (e.g., 100-350 Å) or both wide and narrow pores. In certain embodiments, the support has a BET surface area of at least 50 m²/g, preferably about 50-500 m²/g, more preferably about 50-300 m²/g, or about 150-250 m²/g. Refractory metal oxide support preferably have a pore volume of about 0.1-0.5 g/cc, for example about 0.2-0.4 g/cc, preferably measured by mercury intrusion porosimetry. The mean particle size, based on the particle count, of the support material is preferably about 0.01-10 μm, for example about 0.5-5 μm, about 0.1-1 μm, or about 5-10 μm, and preferably has a majority of the particle count within one of these ranges. In certain embodiments, the D90 particle size of the support is within one of these ranges.

The first catalytic region can extend for 30 to 99 percent of the axial length L; preferably, 40 to 95 percent or 45 to 90 percent of the axial length L; more preferably, 50 to 85 percent of the axial length L; and even more preferably, 65 to 80 percent of the axial length L.

Second Catalytic Region

The combination of the second PGM on a support with low ammonia storage and a first SCR catalyst is either (a) a blend of the second PGM on a support with low ammonia storage with a first SCR catalyst, or (b) a bi-layer having a top layer comprising a first SCR catalyst and a bottom layer comprising the second PGM on a support with low ammonia storage, where the bottom layer can be positioned on a substrate. Preferably, the second catalytic region is a blend of the second PGM on a support with low ammonia storage with a first SCR catalyst.

The support with low ammonia storage can be a siliceous support. The siliceous support can comprise a silica or a zeolite with silica-to-alumina ratio of ≥100, preferably ≥200, more preferably ≥250, even more preferably ≥300, especially ≥400, more especially ≥500, and even more especially ≥750. In each aspect of the invention, the first SCR catalyst is preferably a Cu-SCR catalyst or a Fe-SCR catalyst, more a Cu-SCR catalyst. The second PGM is preferably Pt.

The ratio of the amount of first SCR catalyst to the amount of the second PGM (e.g., Pt) on a support with low ammonia storage in the blend can be in the range of 0.1 to 300:1, inclusive, preferably from 3:1 to 300:1, inclusive, more preferably 7:1 to 100:1, inclusive, even more preferably in the range of 10:1 to 50:1, inclusive, based on the weight of these components.

The term "active component loading" refers to the weight of the support of platinum+the weight of platinum+the weight of the first SCR catalyst in the blend. Platinum can be present in the catalyst in an active component loading from about 0.01 to about 0.3 wt. %, inclusive, preferably, from about 0.03-0.2 wt. %, inclusive, more preferably from about 0.04-0.17 wt. %, inclusive, most preferably, from about 0.05-0.15 wt. %, inclusive.

When platinum is present in the bottom layer of a bi-layer, platinum can be present at from about 0.1 wt. % to 2 wt. %, inclusive, preferably from 0.1 to 1 wt. %, inclusive, more preferably from 0.1 wt. % to 0.5 wt. %, inclusive, relative to the weight of the layer. Additional catalysts such as palladium (Pd), gold (Au) silver (Ag), ruthenium (Ru) or rhodium (Rh) can be present with Pt, preferably in the blend with Pt.

SCR Catalysts

In various embodiments, the compositions can comprise one, two or three SCR catalysts. The first SCR catalyst, which is always present in the compositions, can be present either (1) in a blend with Pt on a support with low ammonia storage or (2) in a top layer when the catalysts are present in a bilayer and Pt is present in a bottom layer. The first SCR catalyst can comprise a first transitional metal and a first molecular sieve. The first transitional metal can be Cu, Fe, Mn, or a combination thereof. The first SCR catalyst preferably a Cu-SCR catalyst or a Fe-SCR catalyst, more preferably a Cu-SCR catalyst. The Cu-SCR catalyst comprises copper and a molecular sieve. The Fe-SCR catalyst comprises iron and a molecular sieve. Molecular sieves are further described below. The molecular sieve can be an aluminosilicate, an aluminophosphate (AlPO), a silico-aluminophosphate (SAPO), or mixtures thereof. The copper or iron can be located within the framework of the molecular sieve and/or in extra-framework (exchangeable) sites within the molecular sieve.

The second and third SCR catalysts can be the same or different. The second and third SCR catalyst can be a base metal, an oxide of a base metal, a noble metal, a molecular sieve, a metal exchanged molecular sieve or a mixture thereof. The base metal can be selected from the group consisting of vanadium (V), molybdenum (Mo), tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. The noble metal can be platinum (Pt), palladium (Pd), gold (Au) silver (Ag), ruthenium (Ru) or rhodium (Rh), or a mixture thereof. The second SCR catalyst can comprise promoted Ce—Zr or $MnO_2$. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Any of the SCR catalysts can comprise a small pore, a medium pore or a large pore molecular sieve, or a mixture thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms. The second and/or third SCR catalysts can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

Any of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

Any of the SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

Any of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

The molecular sieves in the Cu-SCR and Fe-SCR catalysts are preferably selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, BEA, MFI and FER and mixtures and/or intergrowths thereof. More preferably, the molecular sieves in the Cu-SCR and Fe-SCR are selected from the group consisting of AEI, AFX, CHA, DDR, ERI, ITE, KFI, LEV, SFW, BEA, MFI and FER, and mixtures and/or intergrowths thereof.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper ammines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, the second and third catalysts comprise a Cu-SCR catalyst comprising copper and a molecular sieve, an Fe-SCR catalyst comprising iron and a molecular sieve, a vanadium based catalyst, a promoted Ce—Zr or a promoted $MnO_2$.

A metal exchanged molecular sieve can contain in the range of about 0.10% and about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) or iron (Fe) supported molecular sieve having from about 0.1 to about 20.0 wt. % copper or iron of the total weight of the catalyst. More preferably copper or iron is present from about 0.5 wt. % to about 15 wt. % of the total weight of the catalyst. Most preferably copper or iron is present from about 1 wt. % to about 9 wt. % of the total weight of the catalyst.

The compositions can comprise one or more additional metals combined with the second PGM. These one or more additional metals can be gold (Au), iridium (Jr), palladium (Pd), rhodium (Rh), ruthenium (Ru) or silver (Ag). These metals can be present at from about 0.1 wt. % to about 20 wt. %, inclusive, preferably from about 0.3 wt. % to about 10 wt. %, inclusive.

The second catalytic region can extend for 30 to 99 percent of the axial length L; preferably, 40 to 95 percent or 45 to 90 percent of the axial length L; more preferably, 50 to 85 percent of the axial length L; and even more preferably, 65 to 80 percent of the axial length L.

The second catalytic region can cover at least 10%, 20%, 30%, 40%, or 50% of the first catalytic region. In other embodiments, the second catalytic region can cover at least 60%, 70%, 80%, 90%, or 100% of the first catalytic region.

The first catalytic region can begin at the inlet end or at the outlet end. And the second catalytic region can begin at the inlet end or at the outlet end. In some embodiments, the first and the second catalytic regions begin at the different ends. In other embodiments, the first and the second catalytic regions can begin at the same end (i.e., at the inlet end or at the outlet end).

The ratio of the first PGM component to the second PGM component can be from 5:1 to 1:5; preferably, 4:1 to 1:4; more preferably, 3:1 to 1:3; most preferably, 3:2 to 2:3.

Third Catalytic Region

In some embodiments, the catalytic article of the present invention can further comprise a third catalytic region. The third catalytic region can be a second SCR catalyst. The second SCR catalyst can be the same as the first SCR catalyst as described above. Alternatively, the second SCR catalyst can be different from the first SCR catalyst.

The third catalytic region may further comprise another support. Examples of the another support materials include refractory metal oxides such as alumina, silica, zirconia, titania, ceria, and physical mixtures or composites thereof, with alumina being particularly preferred.

The third catalytic region can extend for 20 to 100 percent or 30 to 95 percent of the axial length L; preferably, 40 to 90 percent of the axial length L; more preferably, 50 to 80 percent of the axial length L.

In certain embodiments, the third catalytic region does not cover any of the first catalytic region. In other embodiments, the third catalytic region can cover at least 10%, 20%, 30%, 40%, or 50%, 60%, 70%, 80%, 90%, or 100% of the first catalytic region.

The first, second, third catalytic regions can begin at the inlet end or at the outlet end. In some embodiments, the first, the second, and/or the third catalytic regions can begin at the different ends. In other embodiments, the first, the second, and/or the third catalytic regions can begin at the same end (i.e., at the inlet end or at the outlet end).

Fourth Catalytic Region

In some embodiments, the catalytic article of the present invention can further comprise a fourth catalytic region. The fourth catalytic region can be a third SCR catalyst. The third SCR catalyst can be the same as or different from the first and/or the second SCR catalyst as described above.

The fourth catalytic region can extend for 20 to 100 percent or 30 to 99 percent of the axial length L; preferably, 40 to 95 percent of the axial length L; more preferably, 45 to 85 percent of the axial length L; and even more preferably, 50 to 80 percent of the axial length L.

In certain embodiments, the fourth catalytic region does not cover any of the first catalytic region. In other embodiments, the fourth catalytic region can cover at least 10%, 20%, 30%, 40%, or 50%, 60%, 70%, 80%, 90%, or 100% of the first catalytic region.

The first, second, third, or fourth catalytic regions can begin at the inlet end or at the outlet end. In some embodiments, the first, the second, the third and/or the fourth catalytic regions can begin at the different ends. In other embodiments, the first, the second, the third and/or the fourth catalytic regions can begin at the same end (i.e., at the inlet end or at the outlet end).

In one aspect of the invention, various configurations of catalytic articles comprising the first, second, third, and/or fourth catalytic regions can be prepared as below.

FIG. 1 depicts a first configuration in which first catalytic region extends from the outlet end, second catalytic region extends from the inlet end and partially covers the first catalytic region, and third catalytic region extends from the outlet end and partially covers the second catalytic region.

In the first configuration, preferably, the first, second, and third catalytic region, each independently can extend for 40 to 95 percent or 45 to 90 percent of the axial length L; more preferably, 50 to 85 percent of the axial length L; and even more preferably, 65 to 80 percent of the axial length L. In some embodiments, the overlap between the first and second catalytic regions can be at least 5%, 10%, or 15% of the axial length L. In certain embodiments, the overlap between the second and third catalytic regions can be at least 5%, 10%, or 15% of the axial length L.

Figure 2:
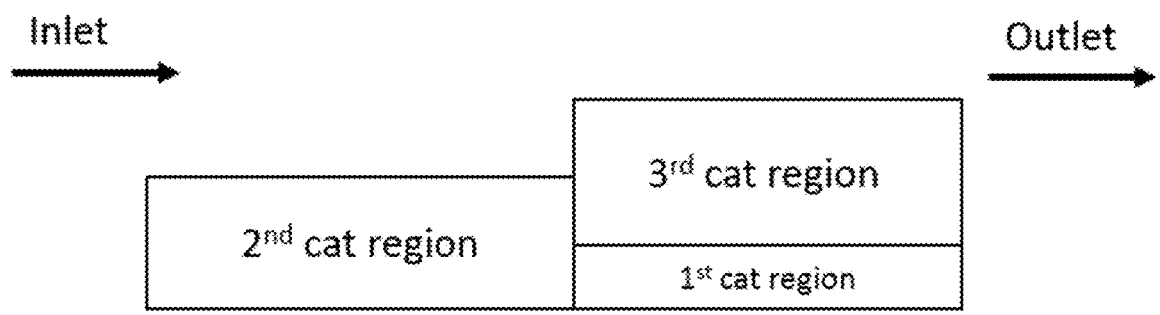
FIG. 2 depicts a configuration in which first catalytic region extends from the outlet end, second catalytic region extends from the inlet end, and third catalytic region extends from the outlet end and covers the first catalytic region.

FIG. 2 depicts a second configuration in which first catalytic region extends from the outlet end, second catalytic region extends from the inlet end, and third catalytic region extends from the outlet end and covers the first catalytic region.

Figure 3:
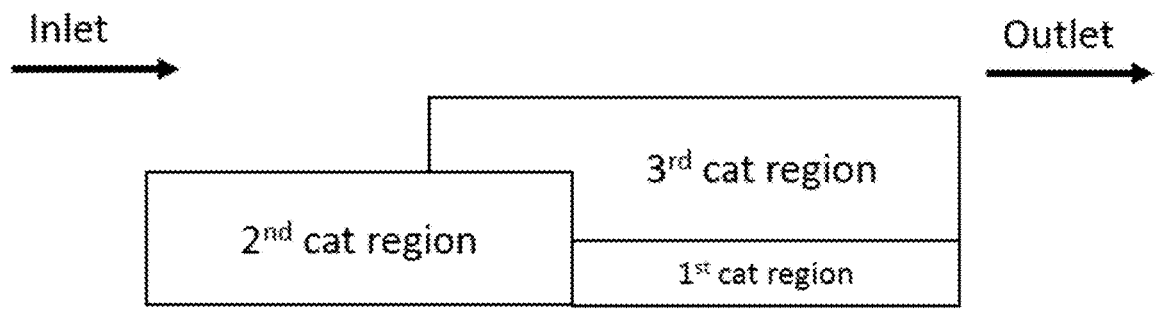
FIG. 3 depicts a configuration in which first catalytic region extends from the outlet end; second catalytic region extends from the inlet end; and third catalytic region extends from the outlet end, covers the first catalytic region, and partially covers the second catalytic region.

FIG. 3 depicts a third configuration in which first catalytic region extends from the outlet end; second catalytic region extends from the inlet end; and third catalytic region extends from the outlet end, covers the first catalytic region, and partially covers the second catalytic region.

Figure 4:
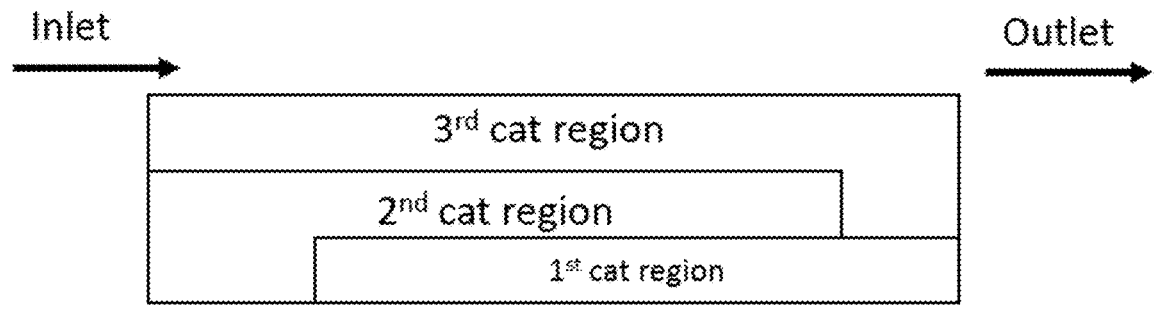
FIG. 4 depicts a configuration in which first catalytic region extends from the outlet end, second catalytic region extends from the inlet end and partially covers the first catalytic region, and third catalytic region extends for 100% of the axial length L.

FIG. 4 depicts a fourth configuration in which first catalytic region extends from the outlet end, second catalytic region extends from the inlet end and partially covers the first catalytic region, and third catalytic region extends for 100% of the axial length L.

Figure 5:
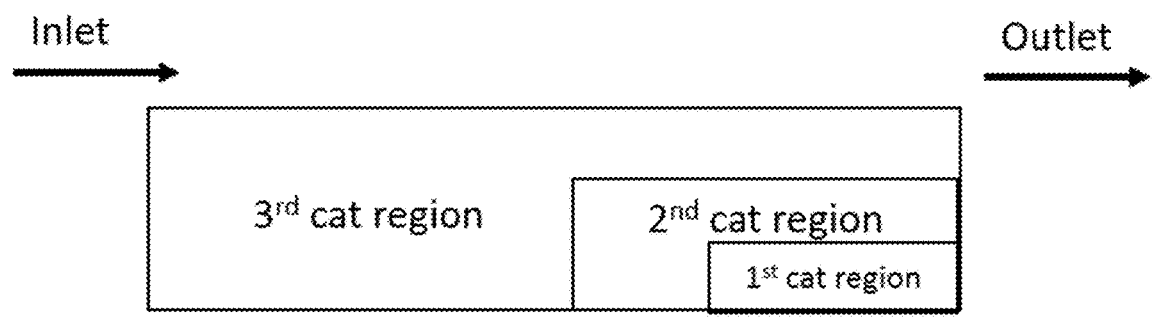
FIG. 5 depicts a configuration in which first catalytic region extends from the outlet end, second catalytic region extends from the outlet end and covers the first catalytic region, and third catalytic region extends for 100% of the axial length L.

FIG. 5 depicts a fifth configuration in which first catalytic region extends from the outlet end, second catalytic region extends from the outlet end and covers the first catalytic region, and third catalytic region extends for 100% of the axial length L.

Figure 6:
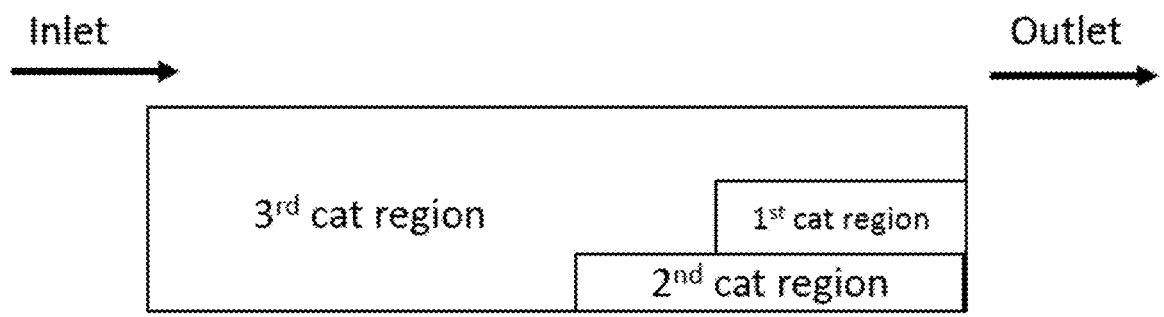
FIG. 6 depicts a configuration in which second catalytic region extends from the outlet end, first catalytic region extends from the outlet end and partially covers the second catalytic region, and third catalytic region extends for 100% of the axial length L.

FIG. 6 depicts a sixth configuration in which second catalytic region extends from the outlet end, first catalytic region extends from the outlet end and partially covers the second catalytic region, and third catalytic region extends for 100% of the axial length L.

Figure 7:
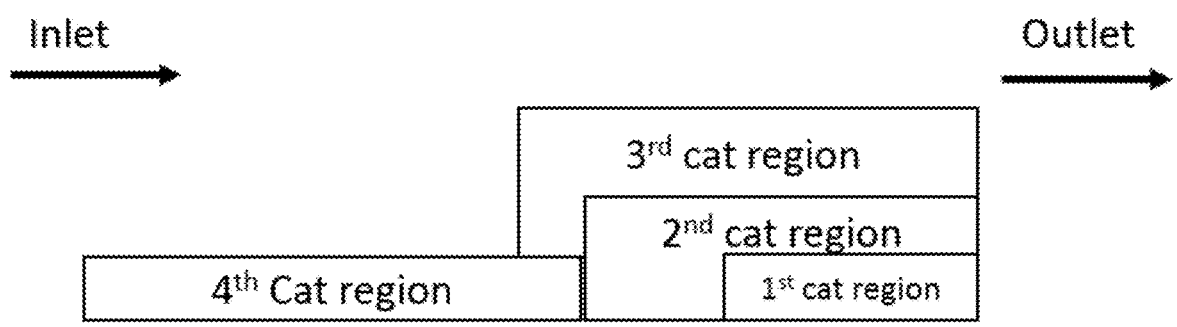
FIG. 7 depicts a configuration in which first catalytic region extends from the outlet end; second catalytic region extends from the outlet end and covers the first catalytic region; fourth catalytic region extends from the inlet end; and third catalytic region extends from the outlet end, covers the second catalytic region, and partially covers the fourth catalytic region.

FIG. 7 depicts a seventh configuration in which first catalytic region extends from the outlet end; second catalytic region extends from the outlet end and covers the first catalytic region; fourth catalytic region extends from the inlet end; and third catalytic region extends from the outlet end, covers the second catalytic region, and partially covers the fourth catalytic region.

Figure 8:
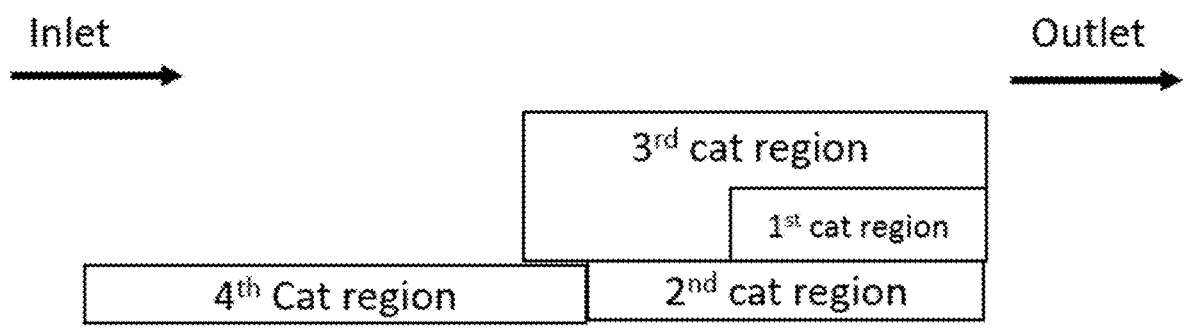
FIG. 8 depicts a configuration in which second catalytic region extends from the outlet end; first catalytic region extends from the outlet end and partially covers the second catalytic region; fourth catalytic region extends from the inlet end; and third catalytic region extends from the outlet end, covers the first catalytic region, and partially covers the fourth catalytic region.

FIG. 8 depicts an eighth configuration in which second catalytic region extends from the outlet end; first catalytic region extends from the outlet end and partially covers the second catalytic region; fourth catalytic region extends from the inlet end; and third catalytic region extends from the outlet end, covers the first catalytic region, and partially covers the fourth catalytic region.

Figure 9:
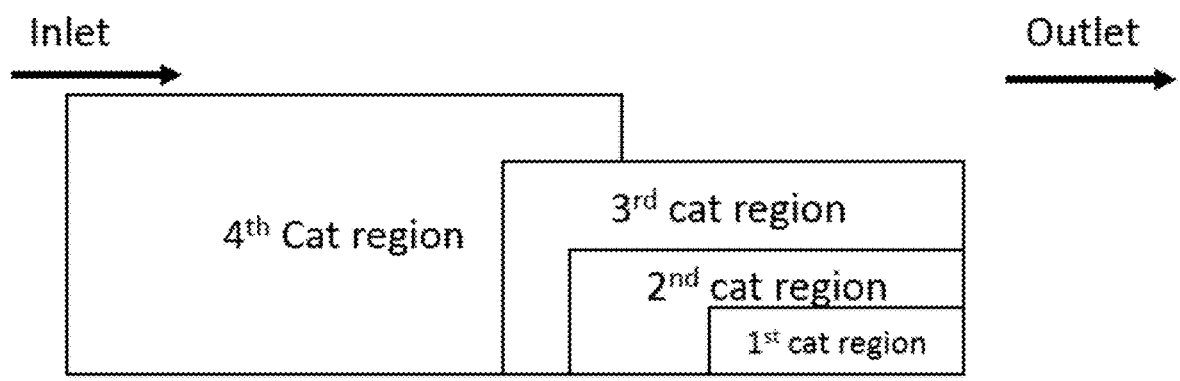
FIG. 9 depicts a configuration in which first catalytic region extends from the outlet end, second catalytic region extends from the outlet end and covers the first catalytic region, third catalytic region extends from the outlet end and covers the second catalytic region, and fourth catalytic region extends from the inlet end and partially covers the third catalytic region.

FIG. 9 depicts a ninth configuration in which first catalytic region extends from the outlet end, second catalytic region extends from the outlet end and covers the first catalytic region, third catalytic region extends from the outlet end and covers the second catalytic region, and fourth catalytic region extends from the inlet end and partially covers the third catalytic region.

Figure 10:
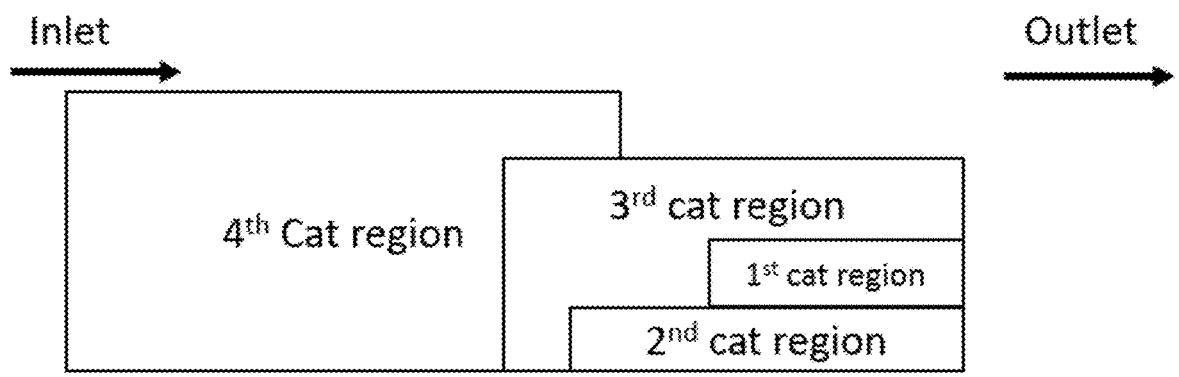
FIG. 10 depicts a configuration in which second catalytic region extends from the outlet end, first catalytic region extends from the outlet end and partially covers the second catalytic region, third catalytic region extends from the outlet end and covers the first and second catalytic regions, and fourth catalytic region extends from the inlet end and partially covers the third catalytic region.

FIG. 10 depicts a tenth configuration in which second catalytic region extends from the outlet end, first catalytic region extends from the outlet end and partially covers the second catalytic region, third catalytic region extends from the outlet end and covers the first and second catalytic regions, and fourth catalytic region extends from the inlet end and partially covers the third catalytic region.

The substrate for the catalytic article of the present invention may be any material typically used for preparing automotive catalysts that comprises a flow-through or filter structure, such as a honeycomb structure, an extruded support, a metallic substrate, or a SCRF. Preferably the substrate has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The passages, which are essentially straight paths from their fluid inlet to their fluid outlet, are defined by walls onto which the catalyst (e.g., ASC or SCR) is coated as a "washcoat" so that the gases flowing through the passages contact the catalytic material. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The substrates can be a high porosity substrate. The term "high porosity substrate" refers to a substrate having a porosity of between about 40% and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Preferably, the substrate can be cordierite, a high porosity cordierite, a metallic substrate, an extruded SCR, a wall flow filter, a filter or an SCRF.

In another aspect, the invention relates to exhaust systems can comprise a catalytic article have one of the ten configurations described above and a means for forming $NH_3$ in the exhaust gas, where $NH_3$ is formed the exhaust gas before the exhaust gas comes in contact with the catalyst.

An exhaust system can comprise (1) a catalytic article described above and (2) a means for forming $NH_3$ in the exhaust gas. where $NH_3$ is formed the exhaust gas before the exhaust gas comes in contact with the catalytic article. An exhaust system can further comprise a DOC, a DPF, at least one additional SCR, at least one additional ASC, or a combination thereof.

In some embodiments, the systems can have arrangements shown as below:
(1) SCR+ASC+DPF+catalytic article of the present invention
(2) SCR+catalytic article of the present invention+DPF+ SCR ASC
(3) DOC/PNA or LNT>DPF>SCR>catalytic article of the present invention In yet another aspect, the invention relates to methods of treating exhaust gas from an internal combustion engine by contacting the exhaust gas with the catalytic articles as described in the first aspect.

In still another aspect, the invention relates to methods of reducing $N_2O$ formation from $NH_3$ in an exhaust gas, the method comprising contacting an exhaust gas comprising ammonia with the catalytic articles as described in the first aspect.

The following examples merely illustrate the invention; the skilled person will recognize many variations that are within the spirit of the invention and scope of the claims.

EXAMPLES

Comparative Catalyst 1

A bottom layer comprising a washcoat of Pt on alumina was applied to the front of a ceramic substrate. The washcoat was pulled down the substrate using a vacuum to a distance of about 50% of the length of the substrate using a vacuum. The article was dried and process repeated on rear of brick in order that entire brick was coated with bottom layer with small region of overlap. The brick was calcined at about 500° C. for about 1 hour. The loading of Pt, and alumina on the article was 2 g/ft$^3$ and 0.35 g/in$^3$ respectively.

A top layer comprising a second washcoat comprising a Cu-AEI was applied to the substrate coated with the bottom layer, and then the washcoat was pulled down the substrate to a distance of about 50% of the length of the substrate using a vacuum. The article was dried and process repeated on rear of brick in order that entire brick was coated with top layer with small region of overlap of top layer. The article was dried and calcined at about 500° C. for about 1 hour. The loading of Cu-AEI in the top layer was 1.8 g/in$^3$. The final article is Comparative Catalyst 1.

Catalyst 2

A layer comprising a washcoat of Pt on alumina was applied to the rear of a ceramic substrate. The washcoat was pulled down the substrate using a vacuum to a distance of about 70% of the length of the substrate using a vacuum. The article was dried and calcined at about 500° C. for about 1 hour. The loading of Pt, and alumina on the article was 1 g/ft$^3$ and 0.35 g/in$^3$ respectively.

A second layer comprising a washcoat comprising a blend of 3 wt. % Pt on a ZSM-5 (MFI framework with SAR=2100) and a Cu-AEI was applied to the front of a ceramic substrate, then the washcoat was pulled down the substrate to a distance of about 70% of the length of the substrate using a vacuum. The article was dried. The loading of Pt, the high SAR zeolite and the Cu-AEI on the article was 1 g/ft$^3$, 0.02 g/in$^3$, and 1.05 g/in$^3$, respectively.

A top layer comprising a second washcoat comprising a Cu-AEI was applied to the substrate coated with the two layers described, and then the washcoat was pulled down the substrate to a distance of about 70% of the length of the substrate using a vacuum. The article was dried and calcined at about 500° C. for about 1 hour. The loading of Cu-AEI in the top layer was 1.05 g/in$^3$. The final article is Catalyst 2.

The configuration of Catalyst 2 is shown in FIG. 1.

Comparative Catalyst 3

Comparative Catalyst 3 was made in the same manner as Comparative Catalyst 1, except for Pt loading. The Pt loading for Comparative Catalyst 3 in bottom layer was 3 g/ft$^3$.

Catalyst 4

Catalyst 4 was made in the same manner as Catalyst 2, except for Pt loading. The Pt loading for the bottom layer (Pt on alumina) was 1.5 g/ft$^3$ and the Pt loading for the second layer was 1.5 g/ft$^3$.

Example 1

Table 1 compares the coldflow backpressure of Comparative Catalyst 1 and Catalyst 2, measured at 1400 m$^3$/hr when prepared on a 10.5×3" 400/4 ceramic brick. As shown in Table 1, Catalyst 2 of showed a ~16% reduction in backpressure over Comparative Catalyst 1.

TABLE 1

Coldflow Backpressure Comparison

|  | Backpressure (mbar) | Percentage Increase (%) |
|---|---|---|
| Bare substrate | 2.8 | — |
| Comparative Catalyst 1 | 6.4 | 129% |
| Catalyst 2 | 5.8 | 108% |

Reference System
   DOC-CSF-SCR only
Comparative System 1
   DOC-CSF-SCR followed by Comparative Catalyst 1
System 2
   DOC-CSF-SCR followed by Catalyst 2

Example 2

Example 2 compares the tailpipe emissions measured for Reference System, Comparative System 1, and System 2 on an engine test bed during a World Harmonised Transient Cycle (WHTC) when the system was dosed at an Ammonia to NO$_x$ ratio of 1.2.

SCR and ASC catalysis were tested fresh and after simulated lifetime ageing of 580° C./100 hrs/10% water. The same DOC and CSF were used in both Fresh and Aged testing.

As shown in Table 2, System 2 containing Catalyst 2 gave lower N$_2$O (~60% reduction) and lower NO$_x$ slip (~5% reduction), when compared with Comparative System 1.

TABLE 2

WHTC cycle tailpipe NO$_x$ and N$_2$O slip and average tailpipe NH$_3$ slip Summary

|  | Reference System (Fresh) | Comparative System 1 (Fresh) | System 2 (Fresh) | Reference System (Aged) | Comparative System 1 (Aged) | System 2 (Aged) |
|---|---|---|---|---|---|---|
| Tailpipe NO$_x$ (g/kWh) | 1.14 | 0.64 | 0.61 | 1.15 | 0.62 | 0.59 |
| Tailpipe N2O slip (g/kWh) | — | 0.20 | 0.08 | — | 0.20 | 0.09 |
| Tailpipe NH$_3$ slip (ppm) | 98.0 | 2.1 | 2.9 | 124.6 | 2.5 | 5.9 |

Example 3

Example 3 compares the N$_2$O tailpipe emissions measured for Comparative System 1 and System 2 on an engine test bed during a WHTC cycle when the system was dosed at an Ammonia to NO$_x$ ratio of 1.2. Catalysis were tested after hydrothermal ageing at 580° C./100 hrs/10% water to simulate lifetime ageing.

Figure 11:
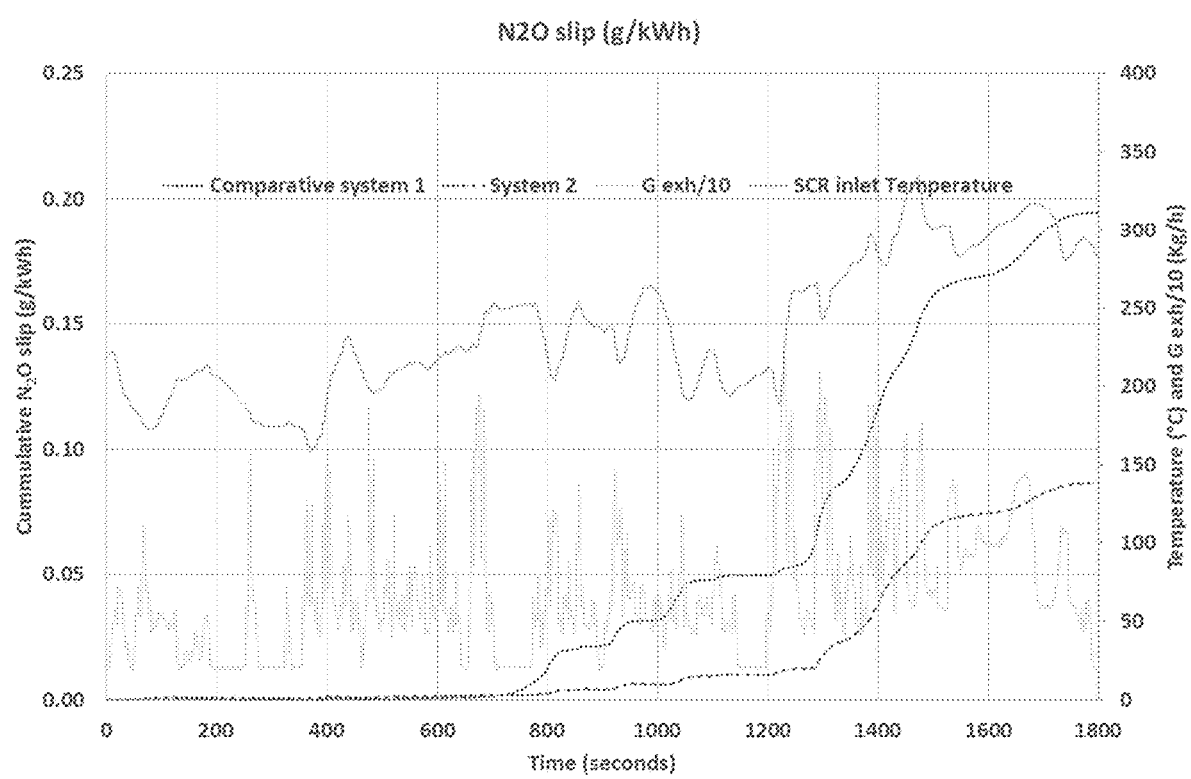
FIG. 11 shows cumulative second by second $N_2O$ emissions during WHTC cycle for engine testing of Comparative System 1 and System 2 (dosing ANR1.2, after hydrothermal oven ageing at 580° C./100 hrs).

As shown in FIG. 11, surprisingly, System 2 (aged) has demonstrated much lower cumulative N$_2$O slip, when compared with Comparative System 1 (aged).

Example 4

Example 4 compares the NH$_3$ oxidation and selective catalytic reduction ("SCR") with associated N$_2$O make of Comparative Catalyst 1, Catalyst 2, Comparative Catalyst 3, and Catalyst 4 when tested in SCAT under gas conditions of either 500 ppm NH$_3$ or 500 ppm NH$_3$/500 ppm NO (ANR=1.0) at space velocity of 180 k. Catalysts were tested both fresh and after hydrothermal ageing at 550° C./100 hrs/10% Water.

Figure 12:
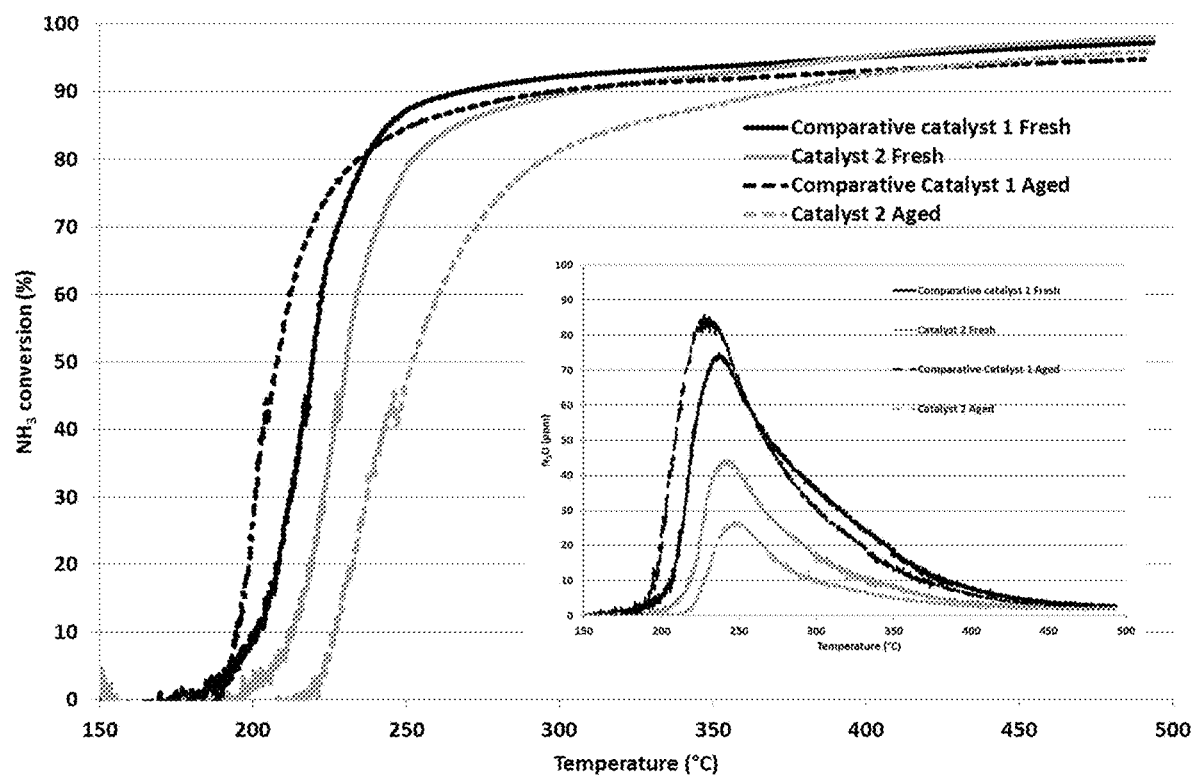
FIG. 12 shows $NH_3$ oxidation and $N_2O$ slip for Comparative Catalyst 1 and Catalyst 2. When tested under synthetic gas test bench ramping temperature from 150-500° C. in constant stream of 500 ppm $NH_3$

FIG. 12 shows NH$_3$ oxidation and N$_2$O slip for Comparative Catalyst 1 and Catalyst 2.

Figure 13:
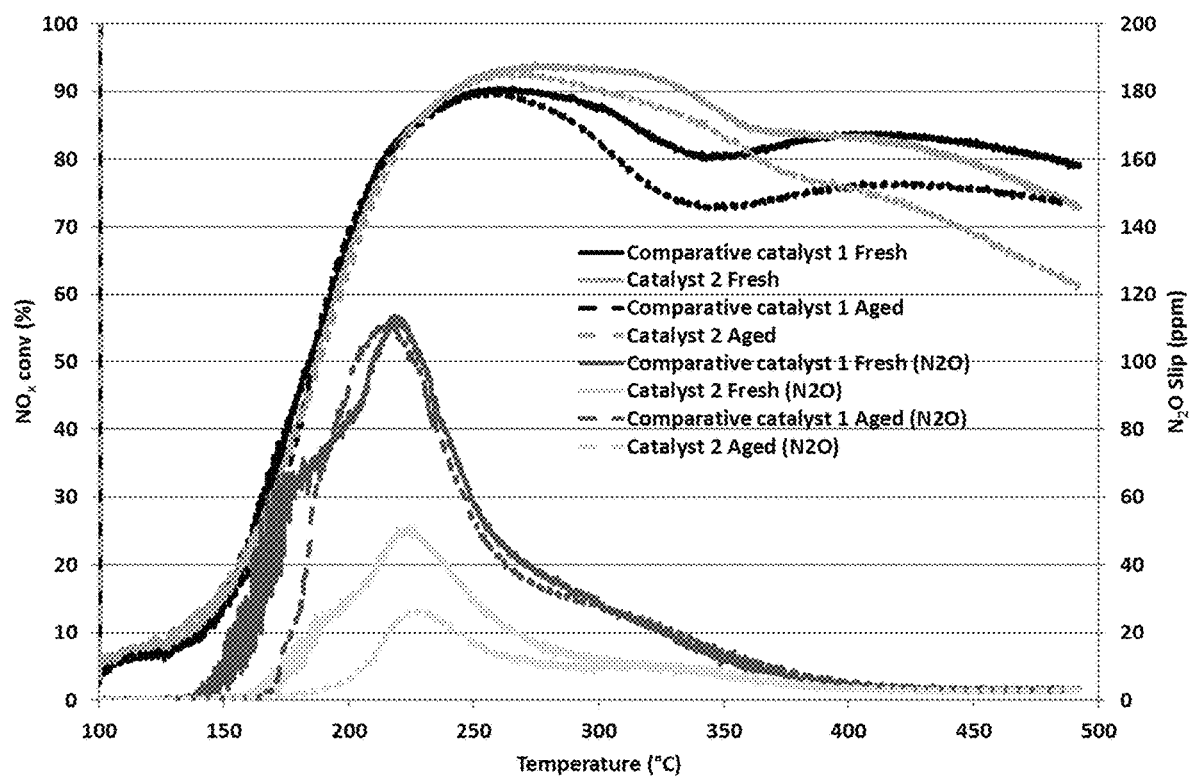
FIG. 13 shows $NH_3$+NO activity (SCR reaction) and accompanying $N_2O$ slip for the Comparative Catalyst 1 and Catalyst 2 when tested under synthetic gas test bench ramping temperature from 150-500° C. in constant stream of 500 ppm $NH_3$ and 500 ppm NON.

FIG. 13 shows NH$_3$+NO activity (SCR reaction) and accompanying N$_2$O slip for the Comparative Catalyst 1 and Catalyst 2.

Figure 14:
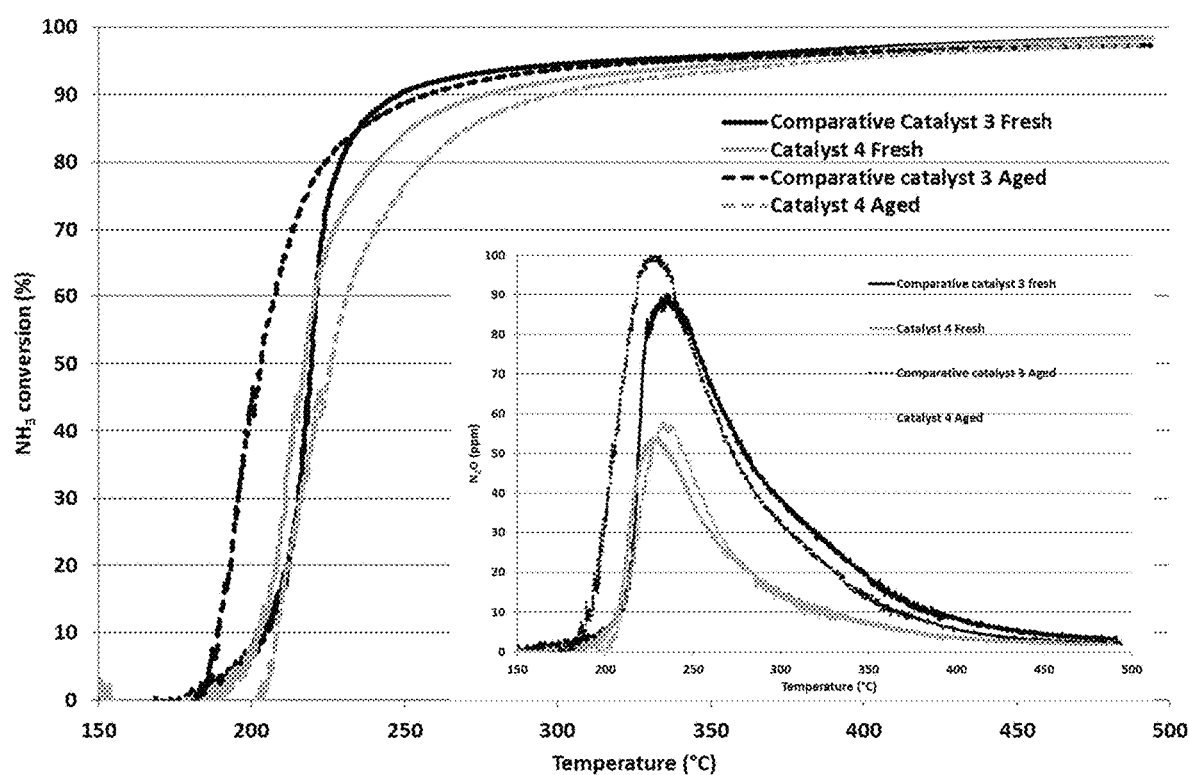
FIG. 14 shows $NH_3$ oxidation and $N_2O$ slip for Comparative Catalyst 3 and Catalyst 4 when tested under synthetic gas test bench ramping temperature from 150-500° C. in constant stream of 500 ppm $NH_3$.

FIG. 14 shows NH$_3$ oxidation and N$_2$O slip for Comparative Catalyst 3 and Catalyst 4.

Figure 15:
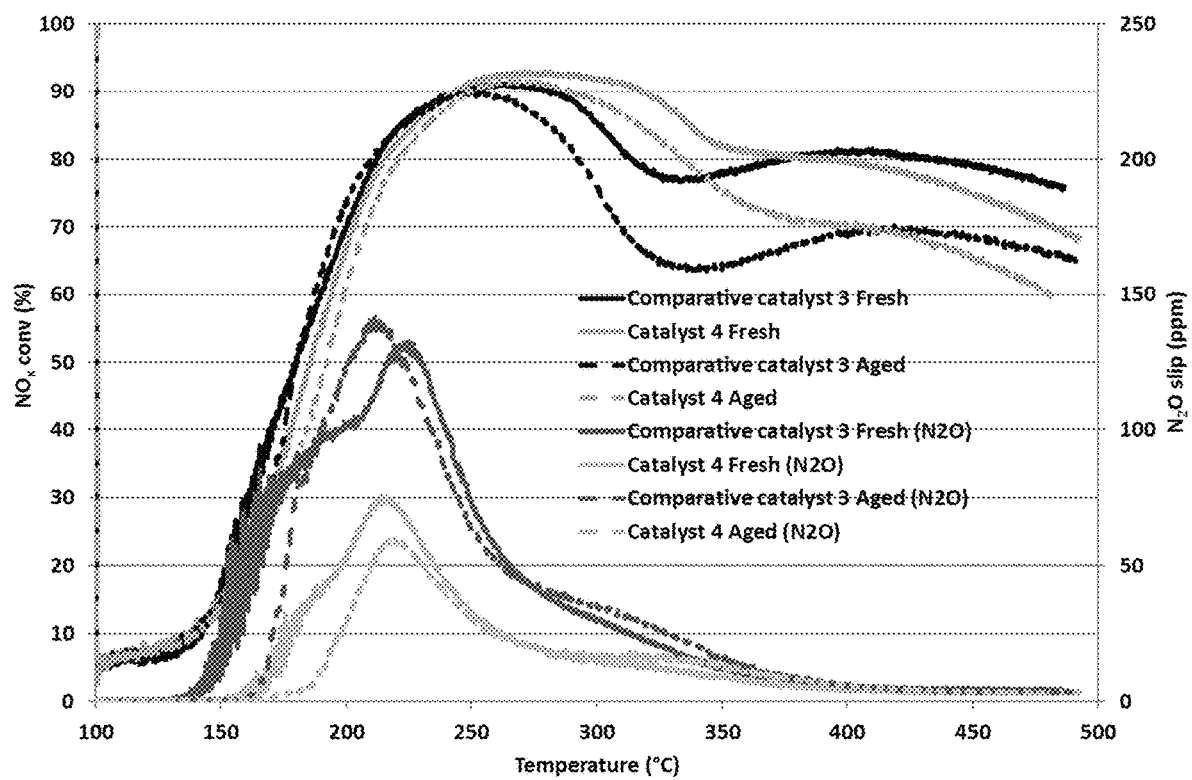
FIG. 15 shows $NH_3$+NO activity (SCR reaction) and accompanying $N_2O$ slip for Comparative Catalyst 3 and Catalyst 4 when tested under synthetic gas test bench ramping temperature from 150-500° C. in constant stream of 500 ppm $NH_3$ and 500 ppm NON.

FIG. 15 shows NH$_3$+NO activity (SCR reaction) and accompanying N$_2$O slip for Comparative Catalyst 3 and Catalyst 4.

As shown in FIGS. 12 and 14, Catalysts 2 and 4 have demonstrated lower N$_2$O make when oxidizing NH$_3$. Lower N$_2$O make was also observed in FIGS. 13 and 15, when catalyst was subjected to NH$_3$ and NO$_x$ (the SCR reaction). In addition Catalysts 2 and 4 showed improved NO$_x$ conversion in the temperature range of 250-350° C.

Example 5

Comparative Catalyst 1 and Catalyst 2 were subjected to extended low temperature engine ageing in sulfur doped fuel to simulate in-field sulfation. Following this, Comparative Catalyst 1 and Catalyst 2 were tested in Comparative System 1 and System 2 respectively. Each system was subjected to 4 WHTCs, 30 minutes at increasing temperatures 350° C.-500° C. and then repeated 4×WHTCs. Each set of 4 WHTCs also included a steady state test point at 250° C./ANR=1.2. The WHTC cycle act as a performance check, whilst running engine at increasing temperature simulates engine management controls to disulfate the catalyst. Clean hydrothermally oven aged samples were also tested. To understand pollutants entering Comparative Catalyst 1 and Catalyst 2, Reference system (DOC-CSF and V-SCR) was tested over the same 4 WHTC regime and same components used in all cases.

Figure 16:
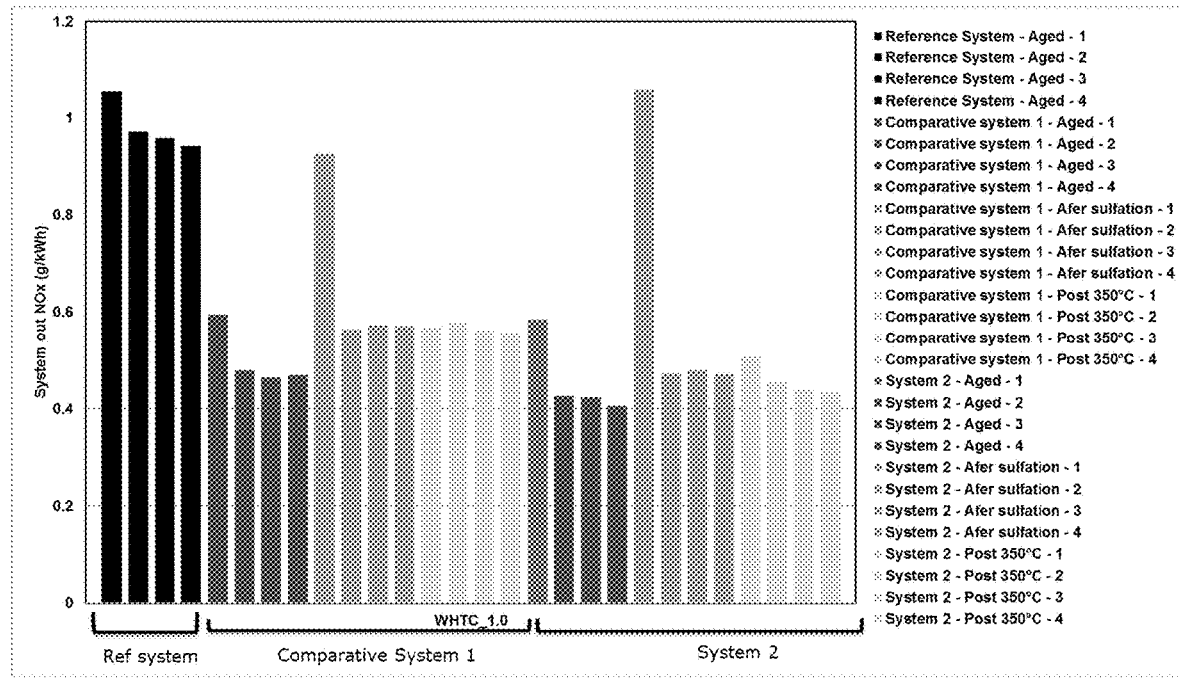
FIG. 16 shows System out $NO_x$ during repeated WHTC cycles for Comparative System 1 and aged System 2 following extended low temperature engine ageing in doped sulfur fuel. Reference System represents the slip into the ASC from DOC-CSF and SCR catalysts. Comparative System 1 shows Reference System with Comparative Catalyst 1 and System 2 shows Reference System tested with Catalyst 2.

As shown in FIG. 16, System 2 has demonstrated faster/better $NO_x$ performance recovery (almost recovered after 1 WHTC cycle), when compared with Comparative System 1. This is further evidence in the steady state point results, as shown in Table 3. This was achieved whilst still retaining some $NH_3$ oxidation activity (See Table 4).

TABLE 3

Post Sulphation $NO_x$ Conversion (%) Summary*

|  | Oven Aged | Post Sulphur | Post Sulphur + 350° C. | Post Sulphur + 400° C. | Post Sulphur + 450° C. | Post Sulphur + 500° C. |
| --- | --- | --- | --- | --- | --- | --- |
| Comparative System 1 | 96.5 | 83.9 | 87.7 | 91.3 | 93.5 | Error |
| System 2 | 95.6 | 81.6 | 89.7 | 95.6 | 95.9 | 96.5 |

*during steady state at 250° C./Ammonia to $NO_x$ Ratio (ANR) = 1.2

TABLE 4

Post Sulphation Average $NH_3$ Slip (ppm) Summary*

|  | Oven Aged | Post Sulphur | Post Sulphur + 350° C. | Post Sulphur + 400° C. | Post Sulphur + 450° C. | Post Sulphur + 500° C. |
| --- | --- | --- | --- | --- | --- | --- |
| Comparative System 1 | 50.4 | 62.9 | 57.3 | 57.9 | 52.4 | 46.6 |
| System 2 | 58.5 | 64.3 | 64.6 | 62.3 | 57.2 | 55.0 |

*during steady state at 250° C./Ammonia to $NO_x$ Ratio (ANR) = 1.2

Example 6

Example 6 compares the $NH_3$ oxidation with associated $N_2O$ make of Comparative Catalyst 3 and Catalyst 4 when tested in SCAT under gas conditions of 500 ppm $NH_3$ at space velocity of 180 k. Catalysts were tested both fresh and after engine ageing. The Catalysts were aged in a SCR/passive diesel particulate filter/V-SCR/ASC configuration downstream of a V-SCR. 1×3" cores of Comparative Catalyst 3 and Catalyst 4 were set inside a large test brick. Real driving conditions were represented by transient cycling on a test bench, also considering adjusted load points to mimic accelerated thermal and chemical ageing (i.e. steady state conditions added to the transient cycling). The ageing conditions included transient cycling within a temperature range of from 150° C. to 470° C., wherein the length of each complete cycle, run consecutively, was approximately 45 minutes. The total length of the engine ageing was 1000 hours.

Figure 17:
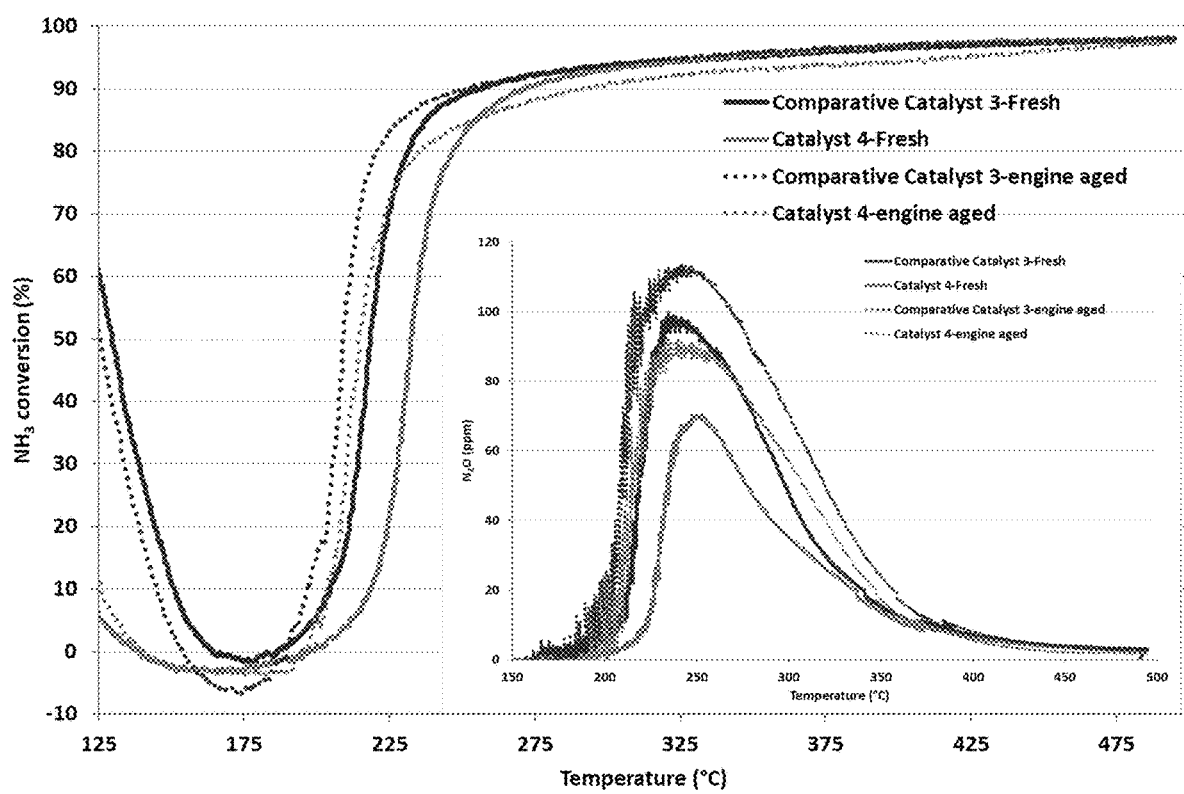
FIG. 17 shows $NH_3$ oxidation and $N_2O$ slip for Comparative Catalyst 3 and Catalyst 4 when tested under synthetic gas test bench ramping temperature from 150-500° C. in constant stream of 500 ppm $NH_3$.

FIG. 17 shows $NH_3$ oxidation and $N_2O$ slip for Comparative Catalyst 3 and Catalyst 4.

As shown in FIG. 17, Catalyst 4 demonstrated lower $N_2O$ make when oxidizing $NH_3$.

The preceding examples are intended only as illustrations; the following claims define the scope of the invention.

We claim:
1. A catalytic article for treating exhaust gas comprising:
a substrate comprising an inlet end and an outlet end with an axial length L;
a first catalytic region comprising a first platinum group metal (PGM) component and a support;
a second catalytic region comprising a second PGM component on a support with low ammonia storage and a first SCR catalyst, wherein the second catalytic region begins at the inlet end and extends for less than the axial length L;
a third catalytic region; and
a fourth catalytic region that begins at the inlet end and extends for less than the axial length L,
wherein the first catalytic region is covered by at least another catalytic region.

2. The catalytic article of claim 1, wherein the first PGM component is Pt.

3. The catalytic article of claim 1, wherein the second PGM component is Pt.

4. The catalytic article of claim 1, wherein the ratio of the first PGM component to the second PGM component is from 5:1 to 1:5.

5. The catalytic article claim 1, wherein the support is alumina, silica, zirconia, titania, ceria, and physical mixtures or composites thereof.

6. The catalytic article claim 1, wherein the first catalytic region extends for 30 to 99 percent of the axial length L.

7. The catalytic article claim 1, wherein the second catalytic region comprises a blend of the second PGM component on the support with low ammonia storage with a first SCR catalyst.

8. The catalytic article claim 1, wherein the support with low ammonia storage is a siliceous support comprising a silica or a zeolite.

9. The catalytic article of claim 8, wherein the zeolite has a silica-to-alumina ratio of ≥100.

10. The catalytic article claim 1, wherein the second catalytic region extends for 30 to 99 percent of the axial length L.

11. The catalytic article claim 1, wherein the second catalytic region covers at least 10% of the first catalytic region.

12. The catalytic article claim 1, wherein the second catalytic region covers 100% of the first catalytic region.

13. The catalytic article claim 1, wherein the first SCR catalyst comprises a first transitional metal and a first molecular sieve.

14. The catalytic article claim 1, wherein the ratio of the amount of the first SCR catalyst to the amount of the second PGM component on the support with low ammonia storage is in the range of 0:1 to 300:1.

15. The catalytic article of claim 1, wherein the third catalytic region comprises a second SCR catalyst, wherein the second SCR catalyst comprises a base metal, an oxide of a base metal, a noble metal, a molecular sieve, a second transitional metal exchanged molecular sieve or a mixture thereof.

16. The catalytic article of claim 1, wherein the third catalytic region covers 100% of the first catalytic region.

17. The catalytic article of claim 1, wherein the fourth catalytic region comprises a third SCR catalyst, wherein the third SCR catalyst comprises a base metal, an oxide of a base metal, a noble metal, a molecular sieve, a third transitional metal exchanged molecular sieve or a mixture thereof.

18. The catalytic article of claim 1, wherein the first catalytic region begins at the outlet end and extends for less than the axial length L.

19. The catalytic article of claim 1, wherein the second catalytic region begins at the outlet end and extends for less than the axial length L.

20. The catalytic article of claim 1, wherein the third catalytic region begins at the outlet end and extends for less than the axial length L.

21. The catalytic article of claim 1, wherein the third catalytic region begins at the inlet end and extends for less than the axial length L.

\* \* \* \* \*